Patented Oct. 12, 1926.

1,602,534

UNITED STATES PATENT OFFICE.

CHARLES F. L. KAUFMANN AND WALLER L. KAUFMANN, OF SANTA ANA, CALIFORNIA.

BUMPER.

Application filed January 31, 1925. Serial No. 5,999.

This invention relates to a bumper or buffer of the class carried by an automobile or similar vehicle.

Hitherto various types of bumpers for automobiles and the like have been formed of spring bar metal, the spring bars being of greater vertical height than thickness. As customarily formed bumpers formed of this material are flexible at all parts and in use are readily distorted out of shape.

It is an object of the present invention to form a bumper out of such bar metal which is provided with a rigid central portion, thus reinforced against distortion upon collision and it is a further object of the invention to provide a novel form of resilient mounting for such rigid bumper front.

Another object of the present invention is to provide a bumper employing both the resiliency of bar metal for absorbing shock from impacts and the like and the shock absorbing properties of the bumper material such as rubber or the like.

Another object of the invention is to provide a bumper which will be exceptionally efficient in operation and can be constructed and attached to the vehicle.

Various other objects and advantages of the present invention will appear from a description of a preferred example of a bumper embodying the invention. For this purpose reference is made to the accompanying drawings, in which a preferred form of the invention is illustrated.

Figure 1:
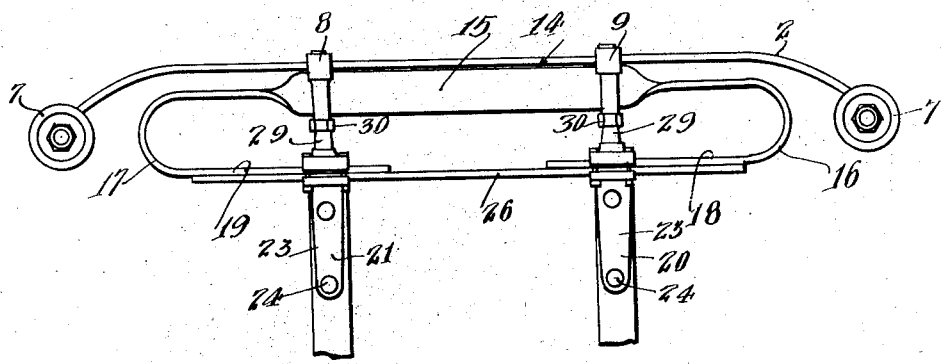
Figure 1 is a plan view.
Figure 2:
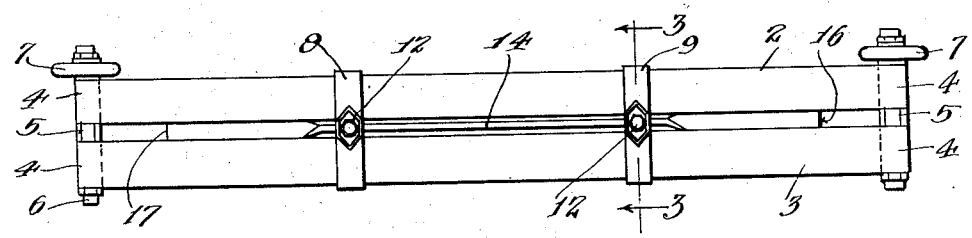
Fig. 2 is a front elevation.

Referring to the drawings, the bumper there illustrated comprises two vertically aligned bars 2 and 3, preferably of spring metal and of greater height than thickness disposed so that they may extend transversely on the vehicle, said bars having ends bent rearwardly as indicated in Fig. 1, and preferably are attached together. The preferred mode of attachment comprises eyes 4 between which are placed eyes 5, all held together by a bolt. Wheels or discs 7 are preferably also held on the bolts 6, the wheels 7 being employed to prevent the ends of the bumper being caught upon different obstructions.

The bars 2 and 3 are engaged by two clamps 8 and 9, each disposed about one-third the distance from the ends of the bars, said clamps comprising front clamping members 10 held to the rear clamping members 11 by set screw 12 or the like. The rear clamping members 11 are provided with horizontal and rearward extensions 12' horizontally slotted from their inner end as indicated at 13 so that they may engage and hold a bar 14 which is provided with a horizontally twisted portion 15 at and extending between the clamps 8 and 9.

The bar 14 has its opposed ends 16 and 17 looped around so as to provide return ends 18 and 19 parallel to the central portion of the front bars 2 and 3 and the back bumper is attached by brackets 20 and 21 engaging said ends to the vehicle. The brackets 20 and 21 may be of duplicate construction, each having a rear or frame engaging part 22 having a curved extremity 23 adapted to sit over the end of the frame of the vehicle which is to carry the bumper, the extensions 23 being adapted to be attached thereto by means of bolts 24 passing through suitable openings in the extensions.

The front of the part 22 provides a vertical bar engaging face 23ª together with a forward clamping part 24ª securely holding the ends 18 and 19 of the bar 14. For additionally stiffening the bumper, the bar 26 may also be passed through the brackets 20 and 21 and extend nearly to the end of the loops 16 and 17 on the bar 14. The clamping parts 22 and 25 are held together by suitable means such as bolts 27. Both of the brackets 20 and 21 further have their front clamping parts 25 shaped to provide sockets 28 for the reception of buffer material such as a tapered rubber member 29.

Figure 3:
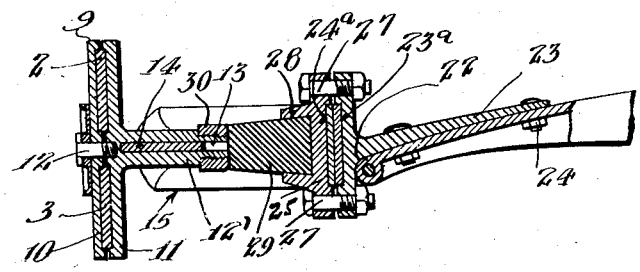
Fig. 3 is a section on the line 3—3 of Fig. 2.

As illustrated in Fig. 3 of the drawings, the buffer material or members 29 extend forwardly in contact with the rear end of extensions 12' of the forward clamps. However, it is not essential to have actual engagement between these parts as by shortening the members 29 or otherwise a space may be left therebetween so that engagement between extensions 12' and buffer members 29 takes place only after a certain load is placed upon the bumper. To the extensions 12' of the clamps nuts 30 may be threaded to the end thereof as indicated.

With a bumper so constructed the horizontally disposed section 15 of the bar 14 is substantially non-yielding in a horizontal direction and thus causes the front bars 2 and 3 between the clamps 8 and 9 to act as of rigid construction, only the ends of such bars being free for independent yielding. Upon the shock to the bumper the rigid portion of the bars 2 and 3 is moved rearwardly against the buffer member 29 (or in cases where slight space is left between the extensions 12' and buffer member 29 such rigid section moves in contact therewith), and then the buffer members 29 and loops of the supporting bar 14 act simultaneously to resist the force applied to the bumper.

By this manner of absorbing the force applied to the bumper, great impact forces may be absorbed without any substantial damage to the bumper itself.

While the embodiment of the invention herein described is well suited for the purpose of this invention, it is not intended to limit the invention to the specific device shown, as various modifications may be made without departing from the spirit of the invention. It should be pointed out that it is not necessary that the portion 15 disposed horizontally for making the front bars rigid should be an integral part of the rearward bar, as the rearward bar may be otherwise attached to the front bars such as by additional spacing clamps or by being broken from section 15 and made to pivotally unite with the ends of the front bars 2 and 3.

This invention is of the scope set forth in the appended claims.

We claim:

1. In an automobile bumper a front buffer bar connected at spaced points to a bar having its greatest transverse dimension lying in a horizontal plane whereby the front bar is provided with a rigid central portion, and means for attaching such bumper to a vehicle.

2. In an automobile bumper, a front bumper bar adapted to extend transversely of the vehicle, a bar having its greatest transverse dimension disposed in a horizontal plane, and connected to the front bar, said bar being disposed so as to be non-yielding in a horizontal direction, a secondary bar supporting the front bars, brackets for attaching the bumper to a vehicle, said brackets supporting a buffer member in position to jointly act together with said secondary bar in absorbing forces of impact.

3. In an automobile bumper, a forward impact structure, a secondary and supporting structure connected by spring loops to the front structure at points spaced from the ends thereof, and buffers disposed between said structures so that forces of impact may be jointly absorbed by said buffers and spring loops.

4. An automobile bumper comprising a plurality of vertically aligned bars, a flat bar having its flat face lying in a horizontal plane, and joined to the medial portion of said bars so as to cause the same to be rigid horizontally, and buffers supported in position to absorb impact imparted to the rigidly joined portion of the first bars.

5. An automobile bumper comprising an impact bar adapted to extend transversely of a vehicle, spaced clamps secured to medial points on said bar, a flat bar arranged with its flat face in a horizontal plane, and held by said clamps in position to reinforce the impact bar, and a secondary bar carrying such impact bar.

6. An automobile bumper comprising a pair of attaching members holding buffers directly in front thereof, an impact bar having a rigid central section, and means mounting such bar in position to bear against said buffers in absorbing impact forces.

7. An automobile bumper having impact bars vertically aligned, a bar connected to the impact bars and operative to cause the central portion thereof to act as a rigid section, a secondary bar yieldingly supporting such impact bars, attaching members connected to said secondary bar, and buffers held by such attaching members in position to jointly act with said secondary bar in yieldingly supporting the impact bars.

8. A bumper comprising a forward impact section connected at spaced points with a flat bar with its flat face lying in a horizontal plane.

9. A bumper comprising a forward impact section including a plurality of vertically spaced spring steel bars, a horizontal bar having its greatest transverse dimension lying in a horizontal plane and means for connecting the horizontal bar intermediate the said vertically spaced bars.

10. A bumper comprising a forward impact section including a plurality of vertically spaced bars, a section with its greatest transverse dimension disposed in a horizontal plane, and means for securing the section in line with the space between the said vertically spaced bars.

11. A bumper comprising a forward impact section including a plurality of vertically spaced bars, a horizontally disposed bar, means for connecting the horizontally disposed bar intermediate the vertically spaced bars at points spaced from the ends thereof, a secondary supporting bar connected to the horizontally disposed bar by yieldable members, and means interposed between the impact section and the supporting bar to absorb an impact shock.

12. A bumper, comprising a forward impact section, a horizontal bar having its greatest transverse dimension lying in a horizontal plane and its end sections twisted at right angles to provide spring loops, and means for connecting the horizontal bar to the forward impact section.

13. A bumper, comprising a forward impact section, a flat steel bar having its mid-section disposed so that its greatest transverse dimension lies in a horizontal plane, said flat steel bar being twisted at its ends to provide spring loops, means for connecting the spring loops to a motor vehicle, means for connecting the said flat steel bar to the forward impact section, and means interposed between the two said connecting means for absorbing an impact shock.

14. A bumper, comprising a forward impact section, including a plurality of vertically spaced spring steel bars, a flat spring bar twisted at its mid-portion to provide a section having its greatest transverse dimension lying in a horizontal plane, means for securing the said flat spring bar at the said twisted mid-section to the said vertically spaced bars, the said flat spring bar being bent upon itself at its opposite end to provide spring loops, and means for securing the spring loops to a motor vehicle.

15. A bumper, comprising a forward impact section, including a pair of vertically spaced bars, a horizontal bar having its greatest transverse dimension lying in a horizontal plane, and a pair of spaced clamps for holding the vertically spaced bars in spaced relation and connecting the same with the said horizontal bar.

16. A bumper, comprising a forward impact section, including a plurality of vertically spaced bars, a horizontal bar having its greatest transverse dimension lying in a horizontal plane, a pair of spaced clamps for holding the vertically spaced spring steel bars in spaced relation and for connecting the said vertically spaced bars rigidly to the said horizontal bar, means for connecting the said bumper with a motor vehicle, and buffer members interposed between the clamps and the said vehicle connecting means.

17. A bumper, comprising a forward impact section, including a plurality of vertically spaced spring steel bars, a horizontal bar having its greatest dimension lying in a horizontal plane, a pair of spaced clamp members secured to the vertical spaced bars and the said horizontal bar in spaced relation, means for attaching said bumper to a vehicle, said means providing sockets for holding buffer members in position to engage the said clamp members for absorbing an impact shock.

Signed at Los Angeles, California, this 20th day of January, 1925.

CHARLES F. L. KAUFMANN.
WALLER L. KAUFMANN.